C. H. CLARK.
GREASE CUP.
APPLICATION FILED JULY 28, 1913.

1,088,538.

Patented Feb. 24, 1914.

Witnesses
Jos. J. Hosler
H. C. Adams

Inventor
C. H. Clark

By Fred B. Billman
Attorney

COLUMBIA PLANOGRAPH CO., WASHINGTON, D. C.

UNITED STATES PATENT OFFICE.

CHESTER H. CLARK, OF ASH FORK, ARIZONA.

GREASE-CUP.

1,088,538. Specification of Letters Patent. Patented Feb. 24, 1914.

Application filed July 28, 1913. Serial No. 781,457.

*To all whom it may concern:*

Be it known that I, CHESTER H. CLARK, a citizen of the United States, residing at Ash Fork, in the county of Yavapai and State of Arizona, have invented certain new and useful Improvements in Grease-Cups, of which the following is a specification.

My invention relates to improvements in grease or lubricating cups, the present embodiment being particularly designed and adapted for use in connection with the bearing portions of the ordinary side or connecting rods of a locomotive engine, it being obvious however, that the improved grease or lubricating cup may be used in connection with various other bearings or journals requiring lubrication.

The primary object of the invention is to provide a generally improved grease or lubricating cup of exceedingly simple, cheap, and efficient construction which may be readily applied to or detached from the bearing or journal to be lubricated and having its parts so arranged and disposed relative to each other as to reduce to a minimum any liability of the parts to become loose or lost while in service.

A still further object is to provide an improved grease cup in which the piston or follower member can only be removed from the lower end of the cup, proper, and then only by the removal of the latter from the bearing or journal to which it is attached.

With the above mentioned and other ends in view, the invention consists in the novel construction, arrangement, and combination of parts, hereinafter described, illustrated in one of its embodiments in the accompanying drawings and particularly pointed out in the appended claims.

Figure 2:
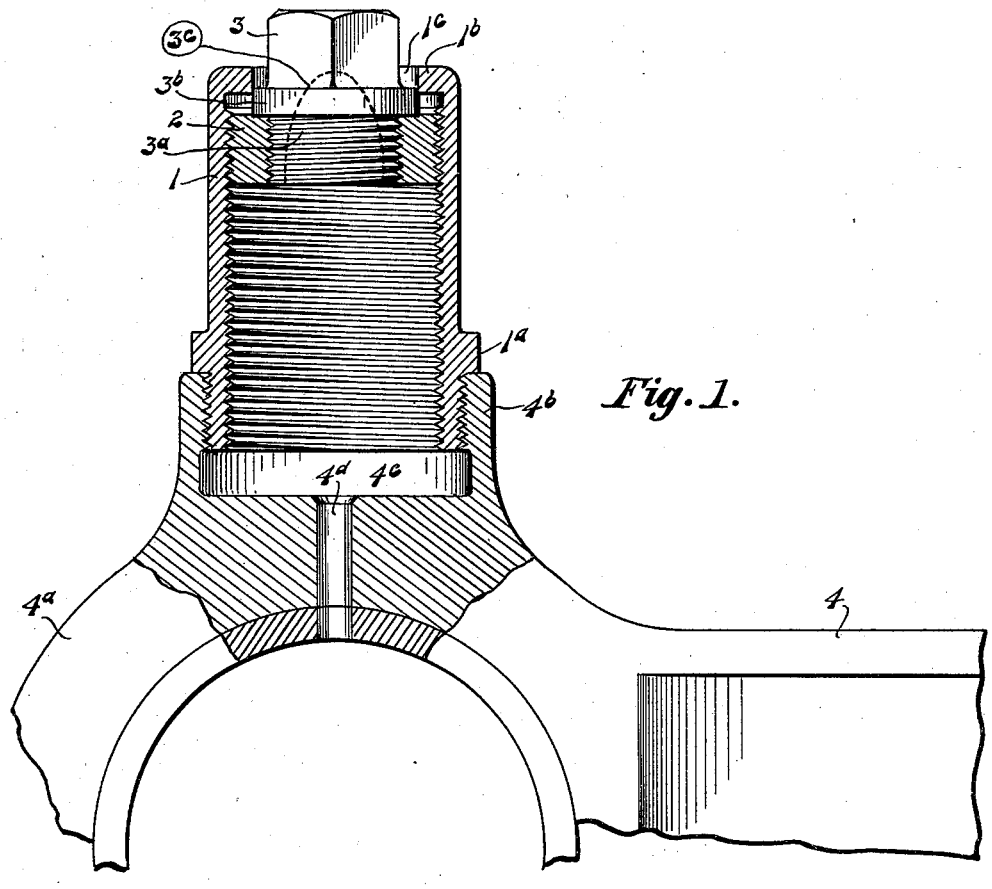
Figure 3:
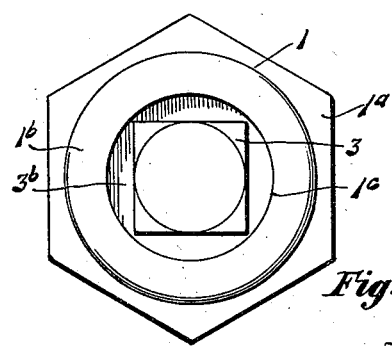

Referring to the drawings, forming a part of this specification, Figure 1, is a side elevation, partly broken away, of the bearing head or portion of one of the side or connecting rods of a locomotive engine equipped with a grease cup constructed in accordance with my invention, the improved grease or lubricating cup being shown in central vertical section. Fig. 2, a perspective view of the piston or plunger plug, removed. Fig. 3, a top plan view of the improved grease or lubricating cup parts being shown in operative or assembled position.

Similar numerals of reference designate like parts throughout all the figures of the drawings.

The improved grease or lubricating cup comprises a cylindrical shaped cup 1 provided at its lower end with external threads for threading into a similarly shaped threaded opening in the journal or bearing portion to be lubricated, said externally threaded portion preferably terminating in an angular or polygonal shaped abutment 1ª, said abutment 1ª, in the present instance, being of a hexagonal shape for the convenient use of a wrench in applying the improved cup to or detaching the same from the bearing or journal to be lubricated.

The improved cup 1 is provided, substantially throughout its length, with internal threads to receive an externally threaded piston or plunger member 2, and as a means for preventing the latter from being removed from or accidentally coming out of the cup 1, when the latter is applied in its operative position as shown in Fig. 1 of the drawings, the upper end of the cup is provided with an angular or an inwardly extending flange 1ᵇ.

As a means for operating or rotating the plunger or piston member 2 whereby the latter may be caused to traverse the internally arranged threads of the cup as in forcing the grease or lubricant out of the cup and into the bearing or journal to be lubricated, or in replenishing the cup with a suitable supply of grease or lubricant, the piston or plunger member 2 is provided with an angular shaped head 3 said head 3 being of less diameter than the opening 1ᶜ afforded by the flange 1ᵇ at the top of the cup, and through which opening 1ᶜ, the head 3 and piston or plunger member 2 may be operated by means of a wrench or other suitable and convenient tool.

As a suitable and convenient means for affording access to the interior of the cup when applied, or in opening and closing same in the act of replenishing the lubricator cup with a suitable supply of lubricant, the piston or plunger member 2 is provided with a threaded opening adapted to receive and contain a threaded plug 3ª of which the head 3 above described forms a part, said plug 3ª having an annular flange or abutment 3ᵇ of less diameter than the opening 1ᶜ so that the plug may be readily inserted or removed through the opening 1ᶜ for the purposes above mentioned. The removable piston or plunger plug is preferably provided with an elliptical or domeshaped cavity 3ᶜ as indicated by dotted lines in Fig. 1, of the drawings.

In the present embodiment of my invention I have shown the same applied to the bearing head or portion 4ᵃ of an ordinary connecting or side rod 4 of a locomotive engine, said head 4ᵃ being provided with an external grease cup or shell 4ᵇ the latter being internally threaded for the reception of the lower externally threaded portion of the grease or lubricator cup 1, said cup or shell portion 4ᵇ forming the base part of the cup 1 when applied, and affording an auxiliary receptacle or chamber 4ᶜ and from which receptacle or chamber 4ᶜ the usual lubricant duct 4ᵈ may lead to the bearing or meeting surfaces to be lubricated.

From the foregoing description, taken in connection with the accompanying drawings, the operation and advantages of my invention will be readily understood.

Having thus described one of the embodiments of my invention, what I claim and desire to secure by Letters Patent is,—

1. A grease-cup, comprising an internally threaded cylindrical cup provided with an externally threaded angular shaped base and a reduced opening at its top, a threaded plunger having a threaded opening, and an operating plug in the latter and adapted to be inserted through and to be operated from said reduced opening.

2. A grease-cup provided with internally arranged threads extending throughout its length and terminating at its top in an inwardly extending flange affording a reduced opening, a threaded plunger member adapted to abut against said flange and to be removed from the lower end of said cup, and a threaded plug mounted in and adapted to operate said plunger member, said plug having an angular shaped head and being of less diameter than said opening at the top of said cup.

3. In a grease-cup, the combination with an internally threaded cup terminating in an overhanging flange at its top, said flange affording a reduced opening; of a threaded plunger adapted to be inserted and removed from the bottom of said cup and to abut against said overhanging flange, and a plunger operating plug adapted to afford access to said cup beneath said plunger and to be inserted through and to be operated from said reduced opening.

4. In a grease-cup, a cylindrical shaped cup provided at its lower end with external threads terminating in an angular abutment, said cup having an inwardly extending flange at its top affording an opening and being provided with internally arranged threads extending from said flange, an internally threaded plunger member mounted in said cup and provided with a threaded opening, and a threaded plug mounted in said threaded opening of said plunger member and provided with an angular shaped plunger actuating head adapted to extend through and to be operated from the opening of said cylindrical shaped cup.

5. An internally threaded grease-cup provided with an externally threaded open base having an angular shaped abutment, and an inwardly extending abutment flange affording a reduced opening at the top, a plunger member adapted to be inserted in and removed from said open base and provided with a threaded opening of less diameter than said reduced opening, and an operating plug mounted in said threaded opening of said plunger member and adapted to be inserted through and operated from said reduced opening.

In testimony whereof I have affixed my signature in presence of two witnesses.

CHESTER H. CLARK.

Witnesses:
CHESTER DICKERSON,
JOHN D. BISHOP.